United States Patent
Kim et al.

(10) Patent No.: US 12,025,869 B2
(45) Date of Patent: Jul. 2, 2024

(54) DISPLAY IMAGE VISIBILITY RESTRICTION

(71) Applicant: Microsoft Technology Licensing, LLC, Redmond, WA (US)

(72) Inventors: Hyungsoo Kim, Seoul (KR); Samu Matias Kallio, Redmond, WA (US); Ying Zheng, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/052,856

(22) Filed: Nov. 4, 2022

(65) Prior Publication Data
US 2024/0151998 A1    May 9, 2024

(51) Int. Cl.
*G02F 1/13*    (2006.01)
*G06F 3/041*    (2006.01)

(52) U.S. Cl.
CPC .......... *G02F 1/1323* (2013.01); *G06F 3/0412* (2013.01)

(58) Field of Classification Search
None
See application file for complete search history.

(56) References Cited

U.S. PATENT DOCUMENTS

| | | | |
|---|---|---|---|
| 6,765,550 B2 | 7/2004 | Janick et al. | |
| 11,366,558 B2 | 6/2022 | Moy et al. | |
| 2002/0122925 A1 | 9/2002 | Liu et al. | |
| 2004/0066363 A1 | 4/2004 | Yamano et al. | |
| 2006/0061869 A1 | 3/2006 | Fadel et al. | |
| 2015/0129856 A1* | 5/2015 | Kim | H10K 59/123 257/40 |
| 2017/0116425 A1 | 4/2017 | Chang | |
| 2019/0204952 A1 | 7/2019 | Han et al. | |
| 2022/0291780 A1 | 9/2022 | Kim | |
| 2023/0215357 A1* | 7/2023 | Hong | H10K 59/121 345/174 |

FOREIGN PATENT DOCUMENTS

WO    WO-2023017999 A1 *    2/2023

OTHER PUBLICATIONS

Watanabe, et al., "An 8.67-in. Foldable OLED Display with an In-cell Touch Sensor", In Journal of SID Symposium Digest of Technical Papers, vol. 46, Issue 1, Jun. 2015, pp. 246-249.
International Search Report and Written Opinion received for PCT Application No. PCT/US2023/033675, Jan. 17, 2024, 14 pages.

* cited by examiner

*Primary Examiner* — Shan Liu
(74) *Attorney, Agent, or Firm* — Alleman Hall & Tuttle LLP

(57) ABSTRACT

A display assembly includes a display layer with a plurality of display elements to provide display light and form a display image. A first subset of display elements is used while the display assembly is operating in a full visibility mode, and a second subset of display elements is used while the display assembly is operating in a restricted visibility mode. A touch-sensitive layer includes a plurality of conductive traces disposed proximate to the display layer. The plurality of conductive traces are shaped and positioned to block a first portion of the display light while the display assembly is operating in the full visibility mode, and block a second, greater portion of the display light while the display assembly is operating in the restricted visibility mode. A visibility controller is used to switch the display assembly between the full visibility mode and the restricted visibility mode.

18 Claims, 9 Drawing Sheets

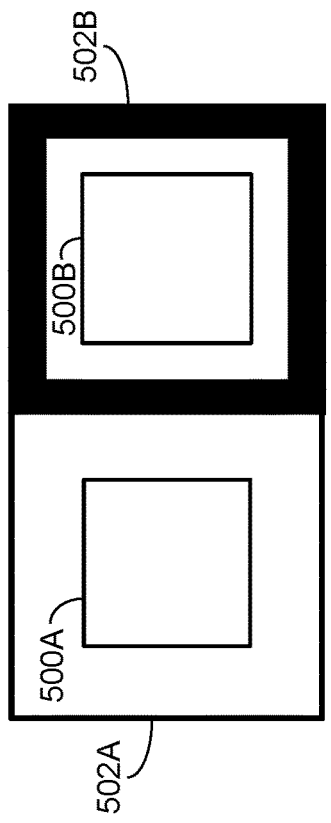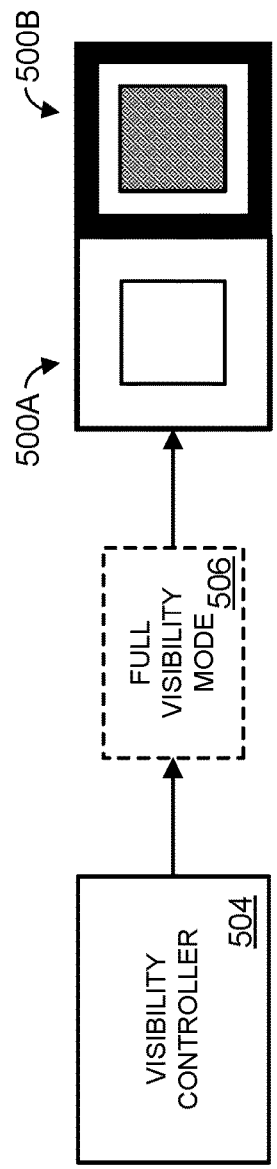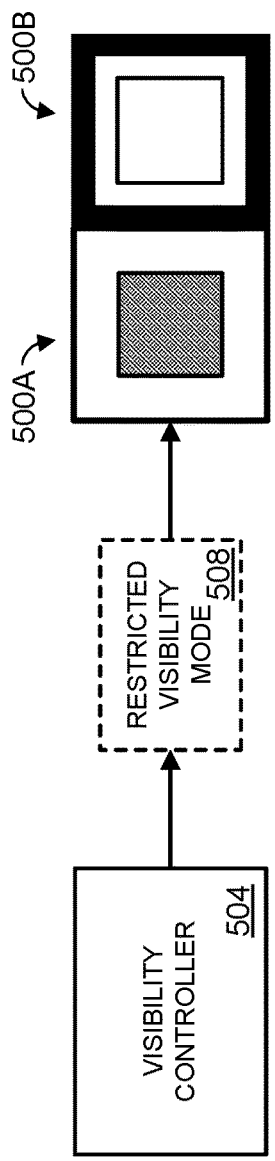

DISPLAY IMAGE VISIBILITY RESTRICTION

BACKGROUND

While using a computing device in an environment in which other people are present, it can be difficult to preserve the privacy of any visual content displayed by the device on an integrated or external display. For instance, a user reviewing sensitive banking or health information would likely prefer to hide such information from any potential onlookers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present disclosure generally describes a design for components of a touch-sensitive display that beneficially enables the display to be switched between a full visibility mode and a restricted visibility mode. Specifically, display elements of a display layer are positioned proximate to a touch-sensitive layer that includes a plurality of conductive traces. The conductive traces are shaped and positioned to block a first portion of display light emitted by a first subset of display elements while the device is operating in full visibility mode. When the device is switched to the restricted visibility mode, the conductive traces block a second, greater portion of display light emitted by a second subset of display elements.

BRIEF DESCRIPTION OF THE DRAWINGS

FIGS. 5A-5C schematically illustrate another example configuration for display elements of a display assembly.

DETAILED DESCRIPTION

Figure 1A:
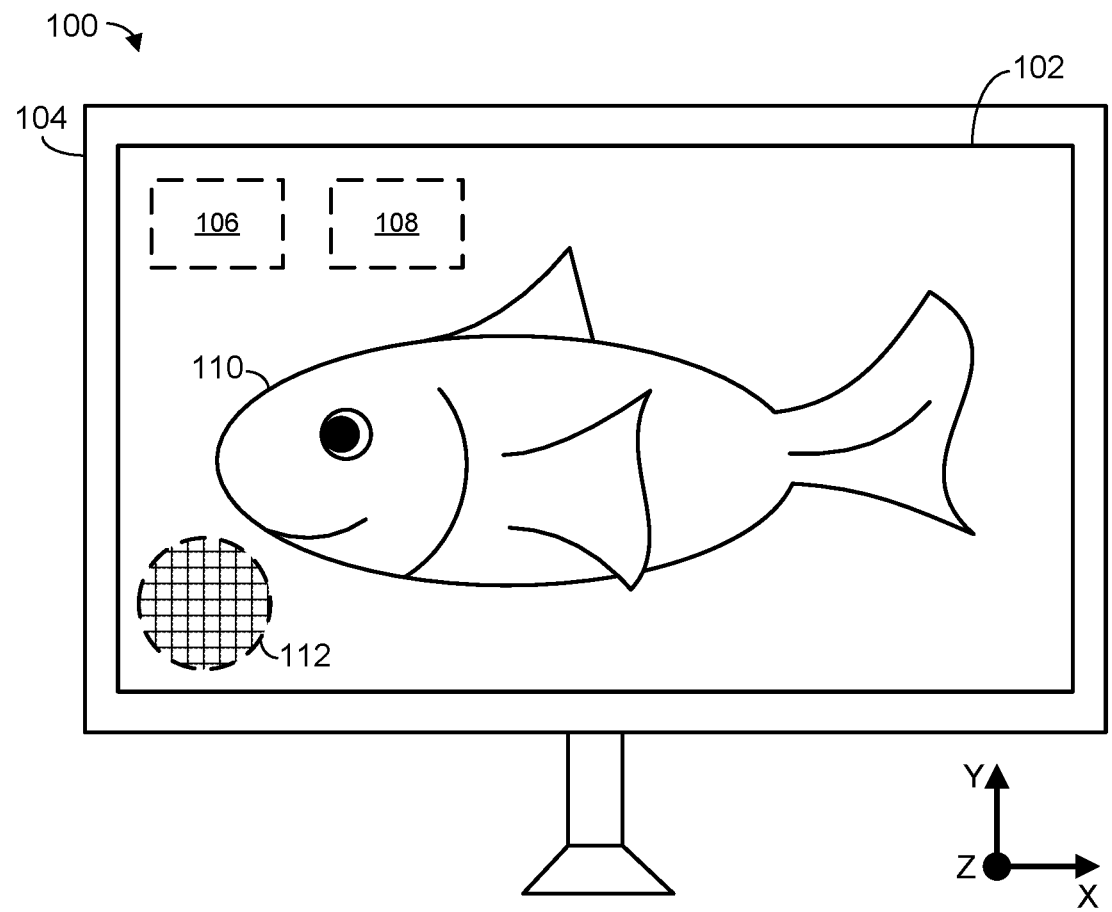
FIGS. 1A-1C schematically show an example display device having a touch-sensitive display useable in both a full visibility mode and a restricted visibility mode.

The present disclosure is directed to a display assembly for a touch-sensitive display device that beneficially enables the device to be switched between a full visibility mode and a restricted visibility mode. As one example, the full visibility mode may be used whenever a user is not particularly concerned with onlookers viewing their displayed content, or is specifically intending to share their displayed content with others. By contrast, the restricted visibility mode may be used whenever a user would prefer to hide or otherwise reduce the visibility of their displayed content—e.g., to reduce the risk that it is seen by nearby onlookers.

The techniques described herein are implemented via a display assembly that includes a display layer and a touch-sensitive layer. The display layer is used to form display images for viewing via a plurality of individually addressable display elements (e.g., pixels or subpixels). A first subset of the display elements are used while the device is operating in the full visibility mode, while a second subset is used when the device is switched to the restricted visibility mode.

The touch-sensitive layer is proximate to the display layer, and includes a plurality of conductive traces used to provide touch-sensing functionality. The plurality of conductive traces are shaped and positioned to block at least a portion of the display light emitted by the plurality of display elements of the display layer. More particularly, some conductive traces block display light provided by the first subset of display elements while the device is operating in the full visibility mode. When the device is switched to the restricted visibility mode, the conductive traces block an overall greater portion of the display light provided by the second subset of display elements. This has the effect of reducing the visibility of the visual content presented on the display. For instance, in some examples, the restricted visibility mode restricts the display light to a narrower range of angles relative to the plane of the display, as compared to the full visibility mode. This preserves visibility of the display image when viewed head-on, while reducing the visibility of the visual content when viewed at an angle.

The techniques and systems described herein beneficially provide for a display assembly that uses integrated components to dynamically switch between different visibility states. This provides a technical benefit by improving human-computer interaction, enabling users to use the display device in a wider variety of settings without fear that their sensitive information is being exposed to onlookers. While aftermarket privacy films capable of visibility restriction are sometimes used, such films require manual application, increase the bulk of the display, come at additional cost, and can be difficult to use in the case of displays with folding or sliding components. As such, the techniques described herein improve over aftermarket privacy films that limit the display to only using a restricted visibility state, and can be difficult to remove after application. Furthermore, the techniques described herein beneficially reduce the amount of display light used to form a display image (e.g., while the device is operating in a restricted visibility state), which has the effect of reducing consumption of computer resources.

The present disclosure generally uses the term "display image" to refer to the visual content formed by providing display light from display elements of a display assembly. It will be understood that the appearance of the display image in some cases changes over time. In other words, the display image formed by the first subset of display elements while the device is operating in the full visibility mode in some cases has a different appearance (e., a different frame of a video) from the display image formed by the second subset of display elements while the device is operating in the restricted visibility mode. Regardless, for the purposes of simplicity, the present disclosure describes the first and second subsets of display elements as forming the same "display image" regardless of whether the device is operating in the full or restricted visibility mode.

Figure 1B:
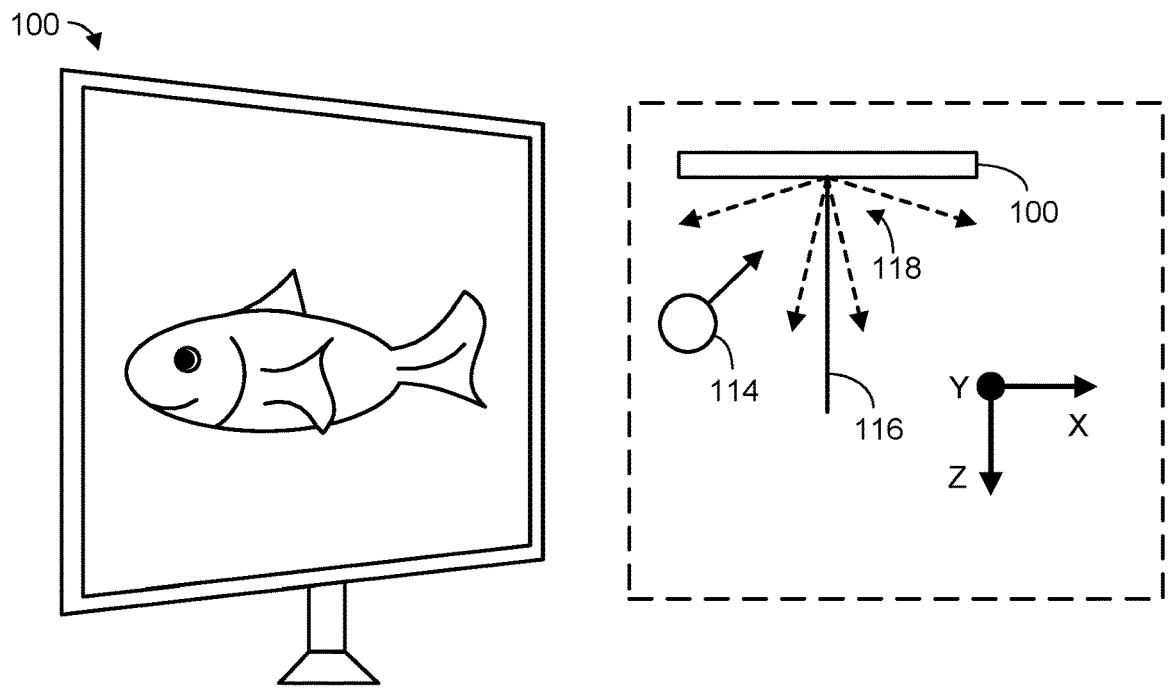
Figure 1C:
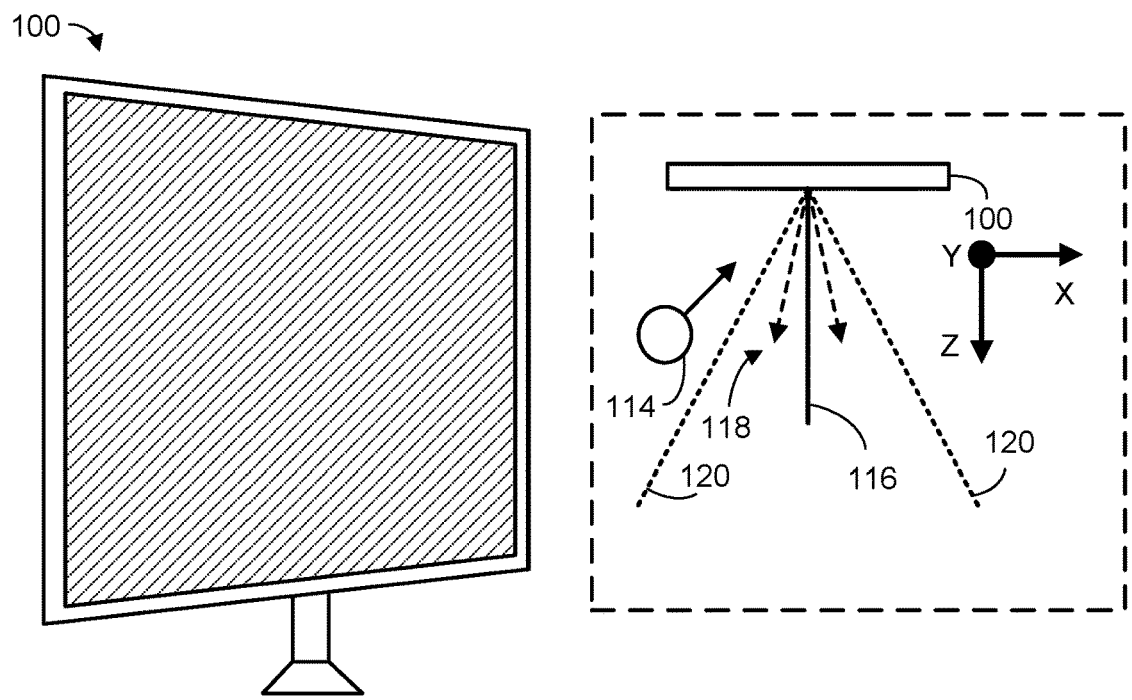

FIG. 1A-1C schematically illustrate visibility restriction of a display image in the context of an example display device 100. It will be understood that the devices and systems depicted in FIGS. 1A-1C, as well as the other figures described herein, are non-limiting examples, schematic in nature, and highly simplified for the sake of illustration. For instance, in the example of FIG. 1A, display device 100 resembles a computer monitor or television—e.g., a standalone display that presents images provided by a separate source. In other examples, the display device itself renders the displayed imagery—e.g., via internal graphics processing components. It will be understood that a "display device" as described herein can have any suitable capabilities, hardware configuration, and form factor. In some examples, a "display device" takes the form of a smartphone, tablet computer, smartwatch, laptop computer, etc. In some examples, display device 100 is implemented as computing system 900 described below with respect to FIG. 9.

Display device 100 includes a touch-sensitive display 102 used to present rendered visual content. The display is integrated into a device housing 104. It will be understood that the relative sizes, shapes, and proportions of the display device itself, the display housing, the touch-sensitive display, and any other components of display device 100, are non-limiting examples. In various examples, the touch-sensitive display uses any suitable underlying technologies for forming display images for viewing (e.g., emissive or transmissive display technologies), and detecting touch inputs from input objects (e.g., self-capacitance, mutual capacitance). Specific examples of suitable display and touch-sensing technologies will be described below.

In some examples, a display device as described herein includes two or more different displays, which may be arranged in a foldable or slidable configuration. In such examples, the techniques described herein can be used to dynamically provide visibility restriction for display images presented on any or all of the two or more displays.

Display device 100 includes a display controller 106. In general, the display controller is useable to control a plurality of display elements of the touch-sensitive display (e.g., individual pixels or subpixels) to form a display image. In some examples, the display image is rendered by the display controller (e.g., based on execution of software instructions), while in other examples the display image is rendered by a separate image source (e.g., a separate computer or media player communicatively coupled with the display device via a suitable wired or wireless connection). The display controller is implemented using any suitable computer logic componentry—e.g., a suitable processor or application-specific integrated circuit. As one example, the display controller is implemented as logic subsystem 902 described below with respect to FIG. 9.

Display device 100 also includes a visibility controller 108. As will be described in more detail below, the visibility controller is useable to dynamically switch the touch-sensitive display between a full visibility mode and a restricted visibility mode. This is done by controlling whether a first subset or a second subset of display elements (e.g., pixels or subpixels) are used to provide display light and thereby form a display image for viewing. As with the display controller, the visibility controller is implemented as any suitable computer logic componentry—e.g., logic subsystem 902 described below with respect to FIG. 9.

Although the visibility controller is described as being separate from the display controller, in some cases the functions described herein as being performed by the display controller and visibility controller are instead merged into a single logic component. In other cases, functions described herein as being performed by the display and visibility controllers are distributed between more than two different logic components. In FIG. 1A, the display and visibility controllers are depicted with dashed lines to indicate that they are disposed within the device and therefore would not be visible from the illustrated perspective. It will be understood that the sizes, shapes, and positions of the display and visibility controllers with respect to the rest of the display device are non-limiting.

In FIG. 1A, the display device is presenting a display image 110 via the touch-sensitive display, taking the form of a cartoon fish in this non-limiting example. In general, a "display image" refers to any visual content presented by way of display elements of the touch-sensitive display. Thus, display images can include image content, frames of a video, text, user interface elements, content rendered via execution of operating system and/or software application instructions, etc. Display images are updated or refreshed at any suitable refresh rate, such as 30 frames-per-second (fps), 60 fps, or 120 fps, as examples.

As discussed above, the display device includes a touch-sensitive display configured to respond to proximity and/or direct contact between the display surface and a suitable input object, such as a stylus or human finger. As will be described in more detail below, such touch-sensing functionality is implemented via a touch-sensitive layer within the display assembly, where the touch-sensitive layer includes a plurality of conductive traces. In some examples, this takes the form of a mesh of metal traces coupled with suitable transmit (Tx) and receive (Rx) electrodes. Proximity of a nearby conductive object (e.g., a human finger) affects the capacitance between the Tx and Rx lines, which is detectable as a touch input localized to a particular location. In FIG. 1A, the display device includes a plurality of conductive traces 112, shown in dashed lines to indicate that the conductive traces are disposed beneath the display surface and therefore would not be visible from the illustrated perspective.

Display device 100 is switchable between a full visibility mode and a restricted visibility mode. This is schematically illustrated with respect to FIGS. 1B and 1C. Specifically, FIG. 1B again shows display device 100, this time viewed from an off-axis angle while the device is operating in the full visibility mode. FIG. 1B also includes a separate top-down view of display device 100, with a marker 114 indicating the position of the observer looking toward the display surface. A reference axis 116 extends away from the display and is perpendicular to the plane of the display surface. This is included to serve as a reference for the relative angle at which the observer is viewing the display device—in this case, an approximately 35° angle relative to the reference axis. FIG. 1B also represents display light 118 propagating away from the display surface, thereby enabling the display image to be viewed.

By contrast, FIG. 1C schematically illustrates a scenario in which the display device is operating in the restricted visibility mode. The observer is still viewing the display from the same angle as in the case of FIG. 1B, although the display image is now obscured. In the top-down view, the display light 118 is shown propagating away from the display device within a viewing zone, bordered by reference lines 120. In this example, the borders of the viewing zone are approximately 30° away from the reference axis 116. In other words, in this example, the restricted visibility mode reduces visibility of the display image from viewing angles greater than 30° away from the reference axis perpendicular to the plane of the display layer. Because the observer is viewing the display surface from an angle outside the viewing zone (e.g., 35° offset from the reference axis), the display image is obscured. It is believed that a viewing zone having borders that are approximately 30° away from the reference axis beneficially provides a good compromise between preserving visibility for the primary user while hiding content from potential onlookers. However, it will be understood that the viewing zone has any suitable size depending on the implementation.

It will be understood that, when viewed from outside the viewing zone while the device is operating in the restricted visibility mode, the touch-sensitive display has any suitable appearance. For instance, in some examples, the touch-sensitive display appears to be blank or off—e.g., substantially the entire display surface is black.

Figure 2A:
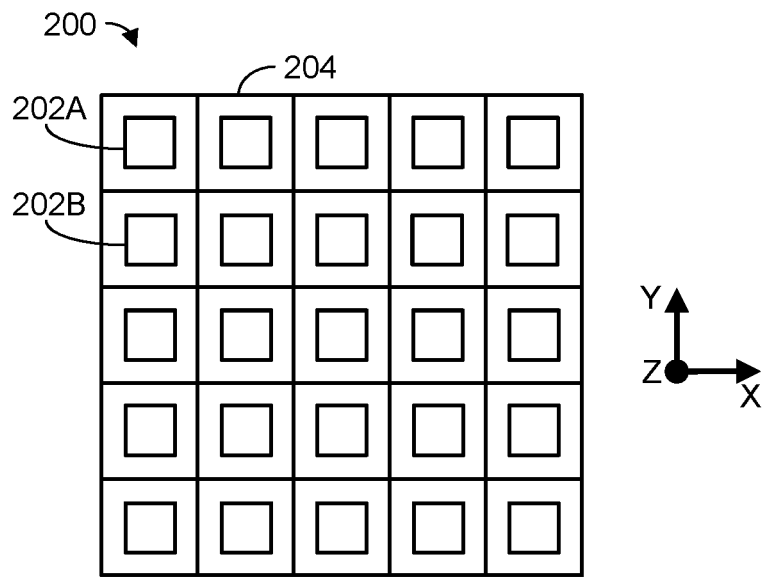
FIGS. 2A and 2B schematically shows aspects of an example display assembly having a display layer and a touch-sensitive layer.
Figure 2B:
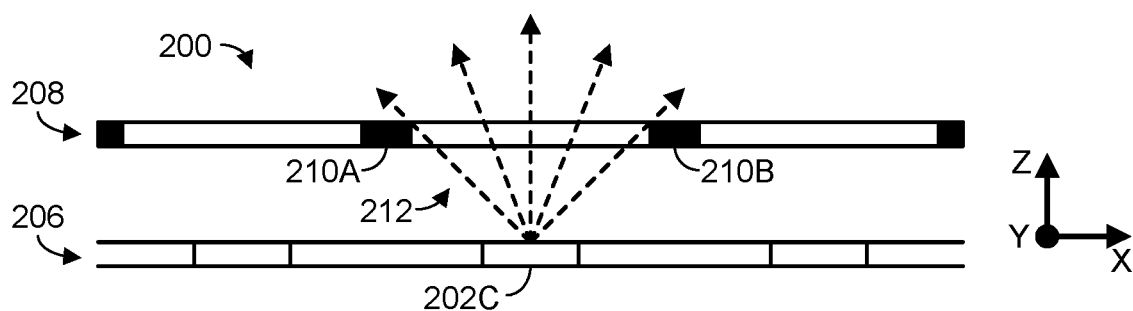

FIGS. 2A and 2B schematically show aspects of an example display assembly 200. FIGS. 2A and 2B are used to introduce components that enable switching between the full and restricted visibility modes, as will be described in more detail below. As shown in FIG. 2A, the display assembly includes a plurality of individually addressable display elements, two of which are labeled as display elements 202A and 202B. These are used to provide display light and collectively form a display image for viewing.

As non-limiting examples, the plurality of display elements take the form of pixels or subpixels arranged according to any suitable layout, such as RGB, BGR, V-RGB, RGBG, RGBY, RGBW, RGBYC, Pentile, etc. The display elements use any suitable transmissive or emissive image-forming technology. As one non-limiting example, the display elements take the form of emissive subpixels of an organic light-emitting diode (OLED) display. In general, the present disclosure uses the terms "pixel" and "subpixel" interchangeably. In other words, as used herein, any functionality attributed to a "pixel" additionally or alternatively refers to a "subpixel," where two or more subpixels collectively comprise a pixel.

FIG. 2A also schematically represents a plurality of conductive traces 204 disposed proximate to the plurality of display elements. As discussed above, the plurality of conductive traces are implemented as part of a touch-sensitive layer that is used to provide touch-sensing functionality for the display device. For instance, in some examples, the plurality of conductive traces are coupled with suitable Rx and Tx electrodes, where a capacitance measured by the electrodes is influenced by proximity of a suitable input object to the plurality of conductive traces. In some examples, separate conductive traces associated with Tx and Rx lines are disposed along two different parallel planes within the touch-sensitive layer—e.g., the Tx traces are disposed above the Rx traces, or vice versa. As one non-limiting example, the plurality of conductive traces are implemented as part of an "on-cell" touch sensor of the display device. In general, however, the plurality of conductive traces are implemented as part of any suitable touch-sensing technology, and are constructed from any suitable materials. As one non-limiting example, the plurality of conductive traces are constructed from suitable non-transparent metals, such as aluminum and titanium.

FIG. 2B schematically shows display assembly 200 in cross-section. As shown, the display assembly includes a display layer 206, which in turn includes a plurality of display elements, one of which is labeled as 202C. As one non-limiting example, the display layer includes an encapsulated OLED display (e.g., using thin-film encapsulation or another suitable approach). The display assembly also includes a touch-sensitive layer 208 disposed proximate to the display layer. For instance, in some examples, the touch-sensitive layer is disposed above a barrier, adhesive, or substrate sublayer of the display layer—e.g., a touch on encapsulation (ToE) design. Regardless, the touch-sensitive layer includes a plurality of conductive traces, two of which are labeled in FIG. 2B as traces 210A and 210B.

As discussed above, the display elements of the display layer collectively provide display light to form a display image for viewing. FIG. 2B illustrates this by showing display light 212 propagating away from display element 202C. The display light passes through the gap between conductive traces 210A and 210B, ultimately propagating away from the surface of the touch-sensitive display for viewing.

Figure 3:
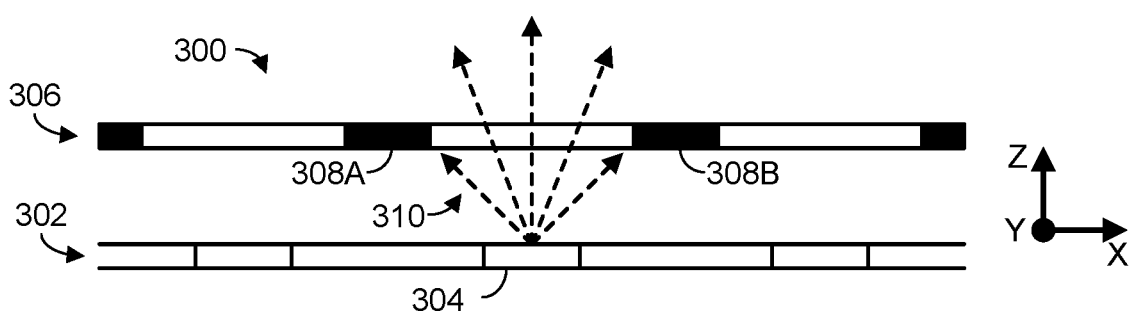
FIG. 3 schematically shows aspects of another example display assembly.

Notably, the amount of display light that is able to exit the touch-sensitive display is dependent on the thickness of the conductive traces of the touch-sensitive layer. This concept is illustrated with respect to FIG. 3, schematically showing another example display assembly 300. As with display assembly 200, display assembly 300 includes a display layer with a plurality of display elements, one of which is labeled as display element 304. Display assembly 300 also includes a touch-sensitive layer 306 having a plurality of conductive traces, two of which are labeled as conductive traces 308A and 308B.

However, as compared to display assembly 200, conductive traces 308A and 308B have a greater thickness than conductive traces 210A and 210B. This affects the amount of display light that is able to pass through the gap between the conductive traces and exit the touch-sensitive display for viewing. Specifically, in the example of FIG. 3, conductive traces 308A and 308B block a greater portion of the display light 310, as compared to the amount of display light 212 blocked by conductive traces 210A and 210B. In other words, increasing the thickness of the conductive traces used to provide touch-sensing functionality has the effect of reducing the amount of display light that exits the touch-sensitive display.

Furthermore, in this example, increasing the thickness of the conductive traces blocks display light in an angle-selective manner. In other words, display light propagating away from the display element at an angle that is perpendicular to the plane of the touch-sensitive display is unaffected by the increased thickness of the conductive traces. However, some display light propagating at off-axis angles (e.g., shallower angles relative to the plane of the touch-sensitive display) is now blocked. Thus, increasing the thickness of the conductive traces results in a narrower range of angles of display light exiting the touch-sensitive display, which in turn results in a narrower range of angles at which the display image is viewable.

The present disclosure will now describe various potential configurations for a display assembly that leverage this phenomenon to beneficially enable switching between full and restricted visibility modes. In general, the display layer of the display assembly includes a first subset of display elements used while the display assembly is operating in the full visibility mode, and a second subset of display elements used while the display assembly is operating in the restricted visibility mode. Differences in the size, shape, and/or position of the conductive trace segments proximate to display elements of the first and second subsets affect the amount of display light that is able to exit the touch-sensitive display for viewing. In other words, the plurality of conductive traces is shaped and positioned to block a first portion of the display light of the first subset of display elements while the display assembly is operating in the full visibility mode, and shaped and positioned to block a second, greater portion of the display light of the second subset of display elements while the display assembly is operating in the restricted visibility mode. This provides a technical benefit by facilitating visibility restriction in a structurally-efficient manner using the conductive traces for two purposes—e.g., touch input detection and visibility restriction.

In one example configuration, the display layer includes a plurality of pixels, and each pixel is portioned into a first display element and a second display element of the plurality of display elements. In other words, each pixel is portioned into two different individually addressable display elements. As discussed above, the present disclosure generally uses the terms "pixel" and "subpixel" interchangeably. Thus, in some examples, the display layer includes a plurality of subpixels, and each subpixel is portioned into two different individually addressable display elements.

Figure 4A:
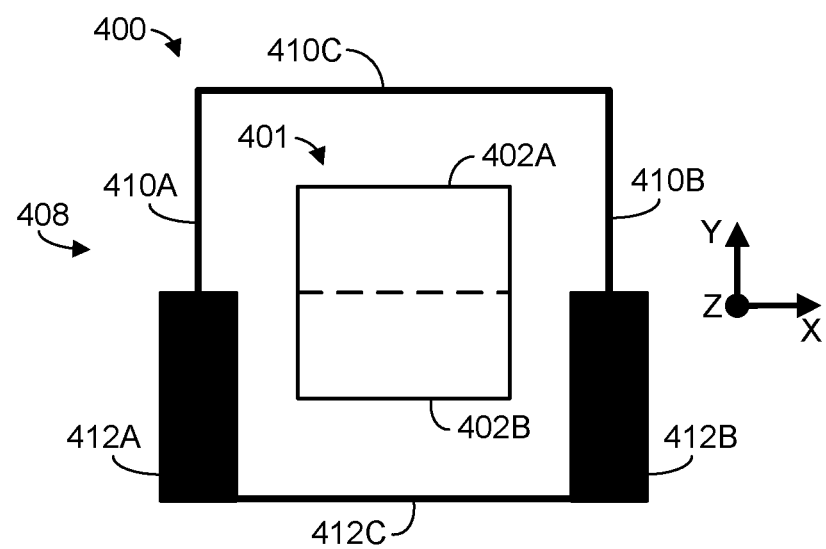
FIGS. 4A-4D schematically illustrate an example configuration for display elements of a display assembly.

This scenario is schematically illustrated with respect to FIG. 4A, which shows a display assembly subunit 400. As used herein, a "display assembly subunit" generally includes one or more display elements along with corresponding conductive trace segments that influence propagation of display light provided by the one or more display elements. A conductive trace segment refers to a portion of a larger conductive trace that is proximate to, and influences display light provided by, a particular display element. Display assembly subunit 400 is one component of a larger display assembly that includes any suitable number of different subunits, depending on the display resolution of the touch-sensitive display. In some examples, all of the pixels of the touch-sensitive display are integrated into subunits that have the same configuration as display assembly subunit 400. In other examples, one or more pixels of the touch-sensitive display are integrated into subunits having different configurations from subunit 400—e.g., associated with a different arrangement of conductive traces.

Subunit 400 includes a pixel 401, portioned into a first display element 402A and a second display element 402B. In the example of FIG. 4A, the pixel is one pixel of an encapsulated OLED display. The first and second display elements are individually addressable—e.g., the first display element is useable while the second display element is inactive, and vice versa. In the example of FIG. 4A, the first and second display elements have substantially similar sizes, as pixel 401 is divided substantially into two equal halves. In other examples, the first and second display elements have different sizes from one another.

Figure 4B:
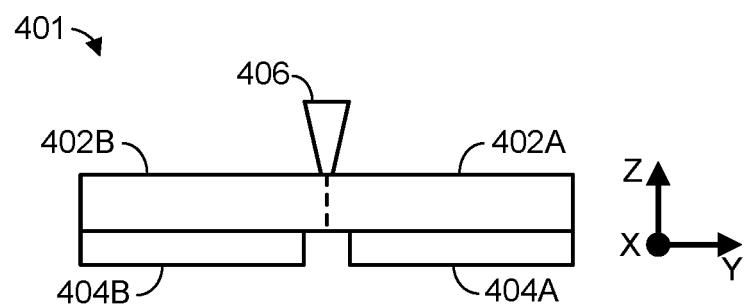

FIG. 4B provides an alternate view of pixel 401 to illustrate how the pixel is portioned into separate display elements 402A and 402B. As shown, each display element is associated with its own respective anode 404A and 404B. Furthermore, a reverse tapered structure 406 separates first display element 402A from second display element 402B. The reverse tapered structure serves to disconnect the organic layers of the pixel (e.g., deposited emission layers). The reverse tapered structure and separate anodes together enable the first and second display elements to be used separately depending on whether the device is operating in the full visibility or restricted visibility mode.

Returning to FIG. 4A, pixel 401 is integrated into a display layer that is proximate to a touch-sensitive layer having a plurality of conductive traces, as discussed above. In FIG. 4A, a portion of the plurality of conductive traces of the touch-sensitive layer is shown as conductive traces 408. More particularly, the display elements are at least partially bordered by corresponding conductive trace segments of the plurality of conductive traces, where different conductive trace segments can have different widths. As used herein, the term "bordered" refers to the perspective shown in FIG. 4A, in which pixel 401 appears to be surrounded by conductive trace segments of the plurality of conductive traces 408. It will be understood that, as is shown in FIGS. 2B and 3, the pixel and conductive traces are separated by a Z axis distance. Regardless, conductive trace segments are described as "bordering" a display element if they are likely to affect propagation of the display light provided by the display element out of the touch-sensitive display.

In some examples, display elements of the first subset of display elements are at least partially bordered by conductive trace segments having a first average thickness, and display elements of the second subset of display elements are at least partially bordered by conductive trace segments having a second, greater average thickness. Such an arrangement beneficially enables the visibility restriction discussed herein, as the traces having the second average thickness will block a greater portion of display light than the conductive traces having the first average thickness. This is also illustrated in FIG. 4A. In this example, first display element 402A of pixel 401 is included in the first subset of display elements. As shown, display element 402A is bordered on three sides by conductive trace segments 410A, 410B, and 410C, each of which has a substantially similar thickness. By contrast, display element 402B is included in the second subset of display elements, and is bordered by conductive trace segments 412A, 412B, and 412C, which have a greater average thickness than trace segments 410A-410C (e.g., due to the increased thickness of trace segments 412A and 412B). It will be understood that the specific thicknesses of the conductive traces shown in FIG. 4A are non-limiting. Depending on the implementation, any conductive trace can have any suitable thickness based on the desired amount of visibility restriction to be provided.

More particularly, second display element 402B is bordered by three different conductive trace segments, including two trace segments 412A and 412B that are parallel to one another, and a trace segment 412C that is orthogonal to trace segments 412A and 412B. The two parallel trace segments have a greater thickness than the third, orthogonal trace segment. In some examples, for display assembly subunits using the configuration depicted in FIG. 4A, the second display element of each pixel is bordered by three or more conductive trace segments, including two parallel trace segments and a third orthogonal trace segment. In such examples, the two parallel trace segments have a greater thickness than the third orthogonal trace segment.

This can be used to beneficially control the spatial axes along which the visibility of the display image is restricted. For instance, using the configuration illustrated in FIG. 4A, the two parallel trace segments are positioned to block at least a portion of the display light propagating along a horizontal viewing axis of the display image. Because the orthogonal trace segment 412C has a smaller width than the parallel trace segments, relatively less display light is blocked along the vertical viewing axis of the display image. This is a beneficial arrangement in some scenarios where it is relatively more likely for an onlooker to see sensitive visual content from a horizontal angle than a vertical angle (e.g., while using a laptop in a public space).

However, it will be understood that this is non-limiting. In other examples, relatively thicker conductive traces are used to reduce visibility of the display image along the vertical viewing axis, in addition to or instead of the horizontal viewing axis. In some examples, the parallel and orthogonal trace segments have substantially similar widths, to provide substantially similar degrees of visibility restriction along both the horizontal and vertical viewing axes.

Figure 4C:
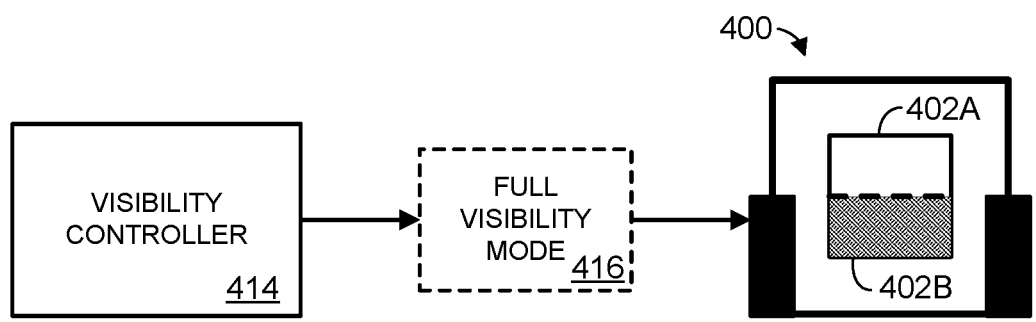

Using the configuration illustrated in FIG. 4A, the display device is switchable between the full visibility mode and restricted visibility mode by controlling which of the two display elements is used to provide display light. This is schematically illustrated with respect to FIGS. 4C and 4D. Specifically, FIG. 4C again schematically shows display assembly subunit 400, including first and second display elements 402A and 402B. FIG. 4C additionally shows a visibility controller 414, implemented substantially as described above with respect to visibility controller 108 of FIG. 1. The visibility controller applies a full visibility mode 416 to the display device. This causes display light to be provided by first display element 402A, while second display element 402B is inactive. A shaded fill pattern is used for second display element 402B to indicate that it is not currently providing display light.

Figure 4D:
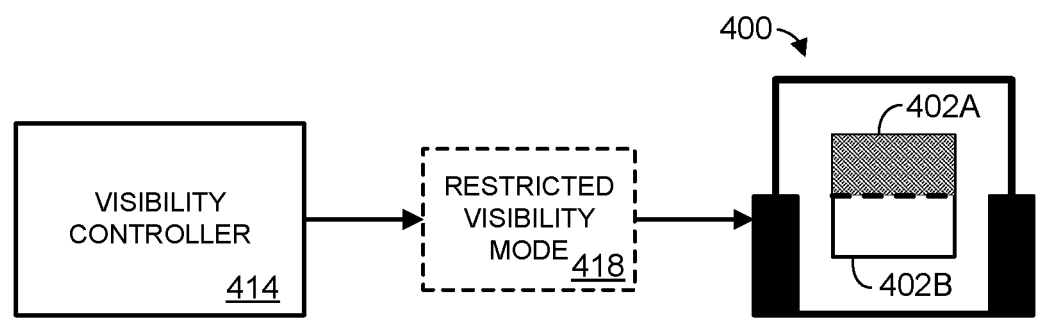

FIG. 4D also shows visibility controller 414 and display assembly subunit 400. However, in this example, the visibility controller has switched the display device to the restricted visibility mode 418. This causes the second display element 402B to provide display light, while the first display element 402A is inactive. Due to the relative thickness of the conductive trace segments bordering second display element 402B, a relatively greater portion of the display light provided by the second display element is blocked, as compared to the portion of the display light provided by the first display element while the device is operating in the full visibility mode.

The visibility controller switches the display device between the full visibility mode and the restricted visibility mode in response to any suitable condition. In some examples, the full visibility mode is the default operating state of the display device, while in other examples the restricted visibility mode is the default operating state. In some examples, a human user specifies whether the device operates in the full or restricted visibility mode by default. Switching between the full and restricted visibility modes in some cases occurs in response to user input—e.g., by interacting with an on-screen a user interface element, interacting with a physical mechanism (such as a button or switch) on the display device, or providing a voice or gesture command. Additionally, or alternatively, switching between the full and restricted visibility modes in some cases occurs automatically—e.g., based on the current location of the device (inferred based on GPS coordinates or the identity of a connected Wi-Fi network), or based on a connected accessory (e.g., device switches from full visibility mode to restricted visibility mode when the audio output of the device is changed from speakers to headphones or earbuds). In some examples, a user specifies the conditions under which the device is automatically switched between the full and restricted visibility modes.

In another example configuration for a display assembly, the plurality of display elements are a plurality of pixels, and each pixel of the first plurality of display elements is paired with a corresponding pixel of the second plurality of display elements. This scenario is schematically illustrated with respect to FIGS. 5A-5C. Specifically, FIG. 5A schematically shows two different pixels of a display assembly, including pixel 500A and pixel 500B. These pixels are bordered by corresponding conductive trace segments 502A and 502B of a plurality of conductive traces of the display assembly. Pixels 500A and 500B, along with their corresponding conductive trace segments, together constitute a display assembly subunit as described above. Thus, in some examples a display assembly comprises a plurality of paired sets of pixels, such as pixels 500A and 500B, which beneficially are useable to provide the visibility restriction techniques described herein in a structurally efficient manner. The number of paired sets of pixels included in the display assembly varies depending on the implementation—e.g., based on the desired pixel resolution of the touch-sensitive display.

In FIG. 5A, conductive trace segments 502B have a greater average thickness than conductive trace segments 502A. Conductive trace segments 502B thereby block a relatively greater portion of the display light provided by pixel 500B while the display device is operating in the restricted visibility mode, as opposed to the amount of display light provided by pixel 500A and blocked by conductive trace segments 502A while the device is operating in the full visibility mode. In general, each pixel of the first subset of display elements of the display assembly is bordered by conductive trace segments having the first average thickness, and each pixel of the second plurality of display elements is bordered by conductive trace segments having a second average thickness.

Notably, in this example, each of the conductive trace segments bordering pixel 500B have a substantially similar thickness. This provides substantially similar degrees of visibility restriction along both the horizontal and vertical viewing axes. In other examples, as discussed above, different conductive trace segments bordering pixel 500B have different thicknesses to provide differing degrees of visibility restriction along the horizontal and vertical viewing axes. For instance, in some scenarios it is relatively more likely for an unintended observer to view a display image from a horizontal angle (e.g., looking over the primary user's shoulder), and thus it may be beneficial to provide more visibility restriction along the horizontal viewing axis.

This configuration enables switching between the full and restricted visibility modes by controlling which of the first pixel or the second pixel is used to provide display light. This is schematically illustrated with respect to FIGS. 5B and 5C. Specifically, FIG. 5B again shows first pixel 500A and second pixel 500B, along with a visibility controller 504. The visibility controller applies a full visibility mode 506, causing first pixel 500A to provide display light while second pixel 500B is inactive. By contrast, in FIG. 5C, the visibility controller has switched the display device to the restricted visibility mode 508, causing pixel 500B to provide display light while pixel 500A is inactive.

In another example configuration for a display assembly, each display element of the second subset of display elements is positioned proximate to a microlens array to block at least a portion of the display light of the second subset of display elements while the display assembly is operating in the restricted visibility mode. Use of microlens arrays may be used in addition to, or as an alternative to, use of conductive traces having variable thickness as described above.

Figure 6A:
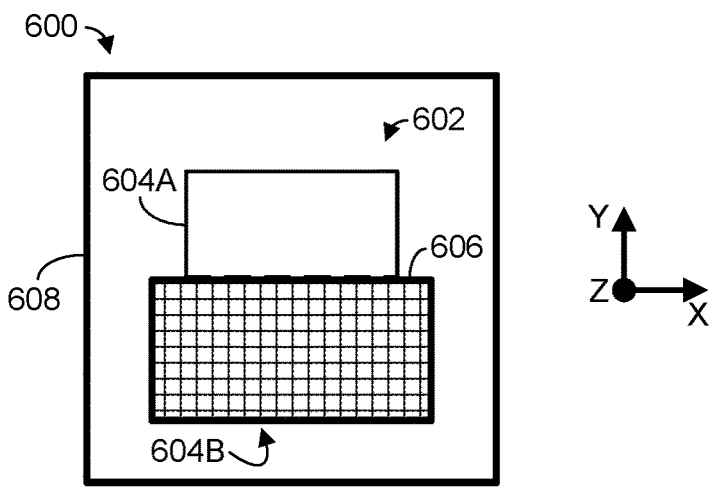
FIGS. 6A and 6B schematically illustrate another example configuration for display elements of a display assembly.
Figure 6B:
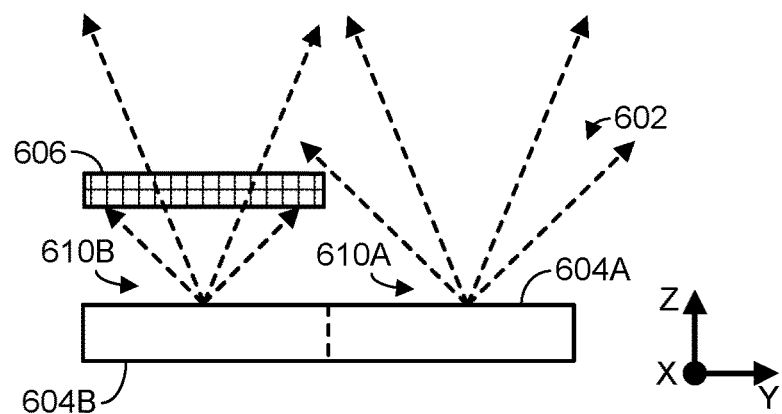

One example display assembly incorporating microlens arrays is schematically illustrated with respect to FIGS. 6A and 6B. Specifically, FIG. 6A again schematically shows an example display assembly subunit 600, including a pixel 602. Similar to pixel 401 of FIG. 4A, pixel 602 is portioned into two different display elements, including a first display element 604A and a second display element 604B. However, in this example, second display element 604B is covered by a corresponding microlens array 606, which serves to limit the range of angles at which display light is able to propagate away from the second display element and exit the touch-sensitive display for viewing. In other words, in this configuration, the display layer includes a plurality of pixels, and each pixel is portioned into a first display element of the first subset of display elements, and a second display element of the second subset of display elements, such that each pixel is partially covered by a corresponding microlens array. This beneficially enables visibility restriction, as the microlens array limits the propagation of display light for part of the pixel that would otherwise be visible outside the privacy viewing zone, while the remaining portion of the pixel is uncovered and can be used in the full visibility mode.

Pixel 602 is additionally bordered by conductive trace segments 608. In this example, the conductive trace segments have a substantially similar thickness. In other examples, however, any or all of the conductive trace segments bordering the pixel have a greater or lesser thickness than is shown in FIG. 6A, and have a greater or lesser thickness than one another—e.g., to selectively provide display image visibility restriction as described above.

FIG. 6B schematically shows an alternate view of pixel 602, including display elements 604A and 604B. Though not shown in FIG. 6B, in some examples pixel 602 includes separate anodes for each display element, and a reverse tapered structure to separate organic layers of the pixel, similar to the configuration showed for pixel 401 in FIG. 4B. In FIG. 6B, first and second display elements 604A and 604B are providing respective display light 610A and 610B. However, as is shown, microlens array 606 limits the range of angles at which the display light is able to propagate out of the touch-sensitive display for viewing. In various examples, such restriction is used to limit the range of angles along either or both of the horizontal and vertical viewing axes of the display image. It will be understood that, while microlens array 606 is depicted as floating above second display element 604B, this is done only to illustrate the spatial arrangements of the components in a simplified manner. In practical scenarios, the microlens array is attached to any suitable components of the display assembly to hold the microlens array in place above second display element 604B.

Using the configuration depicted in FIGS. 6A and 6B, the visibility controller selectively switches the display device between the full and restricted visibility modes by controlling whether the first display element or the second display element is active. In other words, this may be done substantially as described above with respect to FIGS. 4C and 4D.

The microlens array is constructed in any suitable manner. In general, the microlens array takes the form of any suitable set of individual optical elements that influence propagation of display light in a desired manner. In some examples, the lenslets of the microlens array are grown in parallel arrays during the fabrication process, or manufactured out of a material such as a suitable polymer. The individual elements of the microlens array use either or both of a variation in refractive index or a variation in shape to influence the propagation of the display light.

Figure 7:
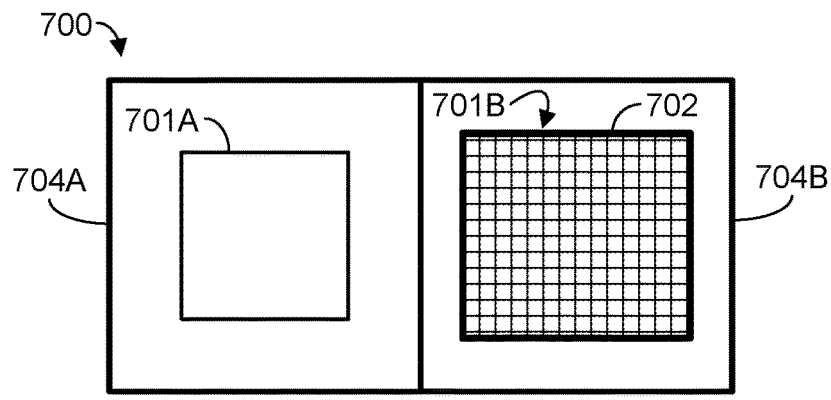
FIG. 7 schematically illustrates another example configuration for display elements of a display assembly.

Another example configuration for the display assembly uses a paired pixel design similar to the configuration shown in FIGS. 5A-5C. However, the pixels of the second subset of display elements are covered by corresponding microlens arrays, in addition to or instead of being bordered by conductive trace segments having a greater average thickness. This is schematically illustrated with respect to FIG. 7, showing another example display assembly subunit 700. Display assembly subunit 700 includes a first pixel 701A of the first subset of display elements, and a second pixel 701B of the second subset of display elements. Second pixel 701B is covered by a corresponding microlens array 702. Additionally, each of pixels 701A and 701B are bordered by corresponding conductive trace segments 704A and 704B. As discussed above, in some examples, the corresponding conductive trace segments 704A and 704B have variable thickness to provide visibility restriction of a display image.

Regardless, as with microlens array 606 described above with respect to FIGS. 6A and 6B, microlens array 702 selectively blocks at least some display light provided by second pixel 701B from exiting the touch-sensitive display for viewing. In some examples, the microlens array limits propagation of the display light along the horizontal and/or vertical viewing axes of the display image. Notably, pixel 701A is not covered by a microlens array, and thus the pixel is used to provide substantially unimpeded display light while the display device is operating in the full visibility mode. In other words, for display assemblies using the configuration illustrated in FIG. 7, the plurality of display elements are a plurality of pixels, each pixel of the first subset of display elements is paired with a corresponding pixel of the second subset of display elements, and pixels of the second plurality of display elements are at least partially covered by corresponding microlens arrays, while pixels of the first subset of display elements lack microlens arrays. The visibility controller selectively switches the display device between the full and restricted visibility modes by controlling whether the first pixel or the second pixel (along with other pixels of the first subset of display elements, or other pixels of the second subset of display elements) is used to provide display light, in a similar manner to the scenario described above with respect to FIGS. 5B and 5C.

The present disclosure has generally described scenarios where either the first subset of display elements are used, or the second subset of display elements are used, depending on whether the device is operating in the full visibility mode or the restricted visibility mode. In some scenarios, however, both the first and second subsets of display elements are used at once. This has the effect of providing a display image that is visible from the same range of viewing angles as in the full visibility mode, while having an overall increased brightness when viewed from within the range of viewing angles permitted by the restricted visibility mode. Additionally, or alternatively, the first and second subsets of display elements need not be mutually exclusive—e.g., the first subset of display elements may include one or more display elements also included in the second subset of display elements.

Figure 8:
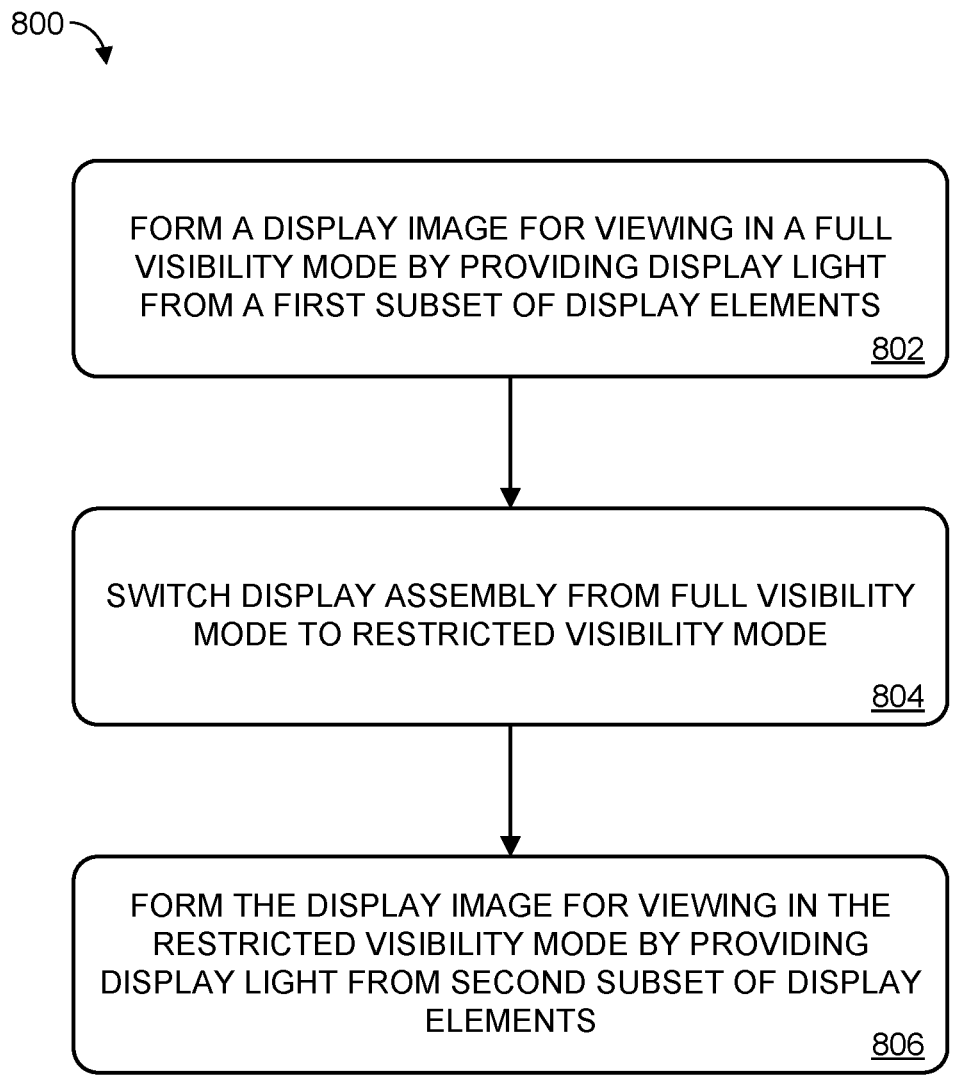
FIG. 8 illustrates an example method for display image visibility restriction.

FIG. 8 illustrates an example method 800 for display image visibility restriction. Method 800 is implemented by any suitable computing system of one or more computing devices. Any computing device implementing steps of method 800 has any suitable capabilities, hardware configuration, and form factor. Method 800 may be implemented by display device 100 of FIGS. 1A-1C, and/or implemented in tandem with any of the display assembly configurations described above. In some examples, method 800 is implemented as computing system 900 described below with respect to FIG. 9.

At 802, method 800 includes forming a display image for viewing in a full visibility mode by providing display light from a first subset of display elements. The first subset of display elements take the form of pixels or subpixels, as examples. In some scenarios, as described above, the display layer of the display assembly includes a plurality of pixels, where each pixel is portioned into a first display element of the first subset, and a second display element of the second subset. In other scenarios, the display layer includes sets of paired pixels, where a first pixel of each pair belongs to the first subset and the second pixel of each pair belongs to the second subset.

At 804, method 800 includes switching the display assembly from a full visibility mode to a restricted visibility mode. As discussed above, such switching occurs in response to any suitable condition. In some examples, the display assembly is switched from the full visibility mode to the restricted visibility mode (or vice versa) in response to user input. Additionally, or alternatively, such switching occurs automatically in response to one or more predefined conditions being met.

At 806, method 800 includes forming the display image for viewing in the restricted visibility mode by providing display light from the second subset of display elements. Notably, the display light provided by the first and second subsets of display elements need not form the same visual content for viewing—e.g., the on-screen content may change over time (such as during playback of a video), and thus the appearance of the display image also changes over time. As discussed above, visibility restriction of the display image in some cases is provided by conductive trace segments proximate to the second subset of display elements blocking at least a portion of the display light—e.g., limiting the range of angles at which the display light propagates away from the touch-sensitive display. Additionally, or alternatively, visibility restriction is provided by microlens arrays covering the display elements of the second sub set.

Method 800 focuses on switching the display device from the full visibility mode to the restricted visibility mode. It will be understood that similar steps are performed in some examples for switching the display device from the restricted visibility mode to the full visibility mode. As discussed above, such switching occurs in response to any suitable condition. Furthermore, either of the full visibility mode or the restricted visibility mode may be used as the default operating state of the display device.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 9:
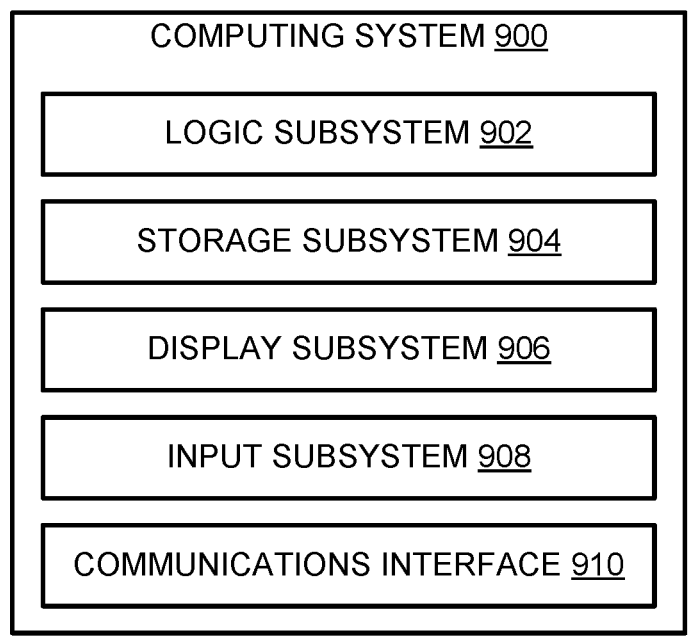
FIG. 9 schematically shows an example computing system.

FIG. 9 schematically shows a simplified representation of a computing system 900 configured to provide any to all of the compute functionality described herein. Computing system 900 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 900 includes a logic subsystem 902 and a storage subsystem 904. Computing system 900 may optionally include a display subsystem 906, input subsystem 908, communication subsystem 910, and/or other subsystems not shown in FIG. 9.

Logic subsystem 902 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 904 includes one or more physical devices configured to temporarily and/or permanently hold computer information such as data and instructions executable by the logic subsystem. When the storage subsystem includes two or more devices, the devices may be collocated and/or remotely located. Storage subsystem 904 may include volatile, nonvolatile, dynamic, static, read/write, read-only, random-access, sequential-access, location-addressable, file-addressable, and/or content-addressable devices. Storage subsystem 904 may include removable and/or built-in devices. When the logic subsystem executes instructions, the state of storage subsystem 904 may be transformed—e.g., to hold different data.

Aspects of logic subsystem 902 and storage subsystem 904 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 906 may be used to present a visual representation of data held by storage subsystem 904. This visual representation may take the form of a graphical user interface (GUI). Display subsystem 906 may include one or more display devices utilizing virtually any type of technology. In some implementations, display subsystem may include one or more virtual-, augmented-, or mixed reality displays.

When included, input subsystem 908 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 910 may be configured to communicatively couple computing system 900 with one or more other computing devices. Communication subsystem 910 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a display assembly comprises: a display layer including a plurality of display elements to provide display light and collectively form a display image for viewing, each of the plurality of display elements being individually addressable, the plurality of display elements including a first subset of display elements used while the display assembly is operating in a full visibility mode, and including a second subset of display elements used while the display assembly is operating in a restricted visibility mode; a touch-sensitive layer including a plurality of conductive traces disposed proximate to the display layer, the plurality of conductive traces shaped and positioned to block a first portion of the display light of the first subset of display elements while the display assembly is operating in the full visibility mode, and shaped and positioned to block a second, greater portion of the display light of the second subset of display elements while the display assembly is operating in the restricted visibility mode; and a visibility controller to switch the display assembly between the full visibility mode and the restricted visibility mode to control visibility of the display image. In this example or any other example, each of the plurality of display elements are at least partially bordered by corresponding conductive trace segments of the plurality of conductive traces, such that display elements of the first subset of display elements are at least partially bordered by conductive trace segments having a first average thickness, and display elements of the second subset of display elements are at least partially bordered by conductive trace segments having a second, greater average thickness. In this example or any other example, the display layer includes a plurality of pixels, and each pixel is portioned into a first display element and a second display element of the plurality of display elements. In this example or any other example, the first display element of each pixel is included in the first subset of display elements and is bordered by conductive trace segments having the first average thickness, and the second display element of each pixel is included in the second subset of display elements and is bordered by conductive trace segments having the second average thickness. In this example or any other example, the second display element of each pixel is bordered by three or more conductive trace segments, including two parallel trace segments and a third orthogonal trace segment, the two parallel trace segments having a greater thickness than the third orthogonal trace segment. In this example or any other example, the two parallel trace segments are positioned to block at least a portion of the display light propagating along a horizontal viewing axis of the display image. In this example or any other example, the plurality of display elements are a plurality of pixels, and each pixel of the first plurality of display elements is paired with a corresponding pixel of the second plurality of display elements. In this example or any other example, each pixel of the first plurality of display elements is bordered by conductive trace segments having the first average thickness, and each pixel of the second plurality of display elements is bordered by conductive trace segments having the second average thickness. In this example or any other example, each display element of the second subset of display elements is positioned proximate to a microlens array to block at least a portion of the display light of the second subset of display elements while the display assembly is operating in the restricted visibility mode. In this example or any other example, the display layer includes a plurality of pixels, and each pixel is portioned into a first display element of the first subset of display elements, and a second display element of the second subset of display elements, such that each pixel is partially covered by a corresponding microlens array. In this example or any other example, the plurality of display elements are a plurality of pixels, each pixel of the first subset of display elements is paired with a corresponding pixel of the second subset of display elements, and pixels of the second plurality of display elements are at least partially covered by corresponding microlens arrays, while pixels of the first subset of display elements lack microlens arrays. In this example or any other example, the restricted visibility mode reduces visibility of the display image from viewing angles greater than 30 degrees away from a reference axis perpendicular to a plane of the display layer. In this example or any other example, the display layer includes an encapsulated organic light-emitting diode (OLED) display. In this example or any other example, the plurality of conductive traces are implemented as part of an on-cell touch sensor of the touch-sensitive layer.

In an example, a display device comprises: a device housing; a display controller to control operation of a plurality of display elements to form a display image for viewing; a touch-sensitive display controllable by the display controller to present the display image, the touch-sensitive display comprising: a display layer including the plurality of display elements to provide display light and collectively form the display image, each of the plurality of display elements being individually addressable, the plurality of display elements including a first subset of display elements used while the display device is operating in a full visibility mode, and including a second subset of display elements used while the display device is operating in a restricted visibility mode; and a touch-sensitive layer including a plurality of conductive traces disposed proximate to the display layer, the plurality of conductive traces shaped and positioned to block a first portion of the display light of the first subset of display elements while the display device is operating in the full visibility mode, and shaped and positioned to block a second, greater portion of the display light of the second subset of display elements while the display device is operating in the restricted visibility mode; and a visibility controller to switch the touch-sensitive display between the full visibility mode and the restricted visibility mode to control visibility of the display image. In this example or any other example, each of the plurality of display elements are at least partially bordered by corresponding conductive trace segments of the plurality of conductive traces, such that display elements of the first subset of display elements are at least partially bordered by conductive trace segments having a first average thickness, and display elements of the second subset of display elements are at least partially bordered by conductive trace segments having a second, greater average thickness. In this example or any other example, the display layer includes a plurality of pixels, and each pixel is portioned into a first display element of the first subset of display elements, and a second display element of the second subset of display elements. In this example or any other example, the plurality of display elements are a plurality of pixels, and wherein each pixel of the first plurality of display elements is paired with a corresponding pixel of the second plurality of display elements. In this example or any other example, each display element of the second subset of display elements is positioned proximate to a microlens array to block at least a portion of the display light of the second subset of display elements while the display device is operating in the restricted visibility mode.

In an example, a method for display image visibility restriction comprises: at a display layer of a display assembly, forming a display image for viewing in a full visibility mode by providing display light from a first subset of display elements of the display layer, the first subset of display elements positioned proximate to a plurality of conductive traces shaped and positioned to block a first portion of the display light from the first subset of display elements, the plurality of conductive traces integrated into a touch-sensitive layer of the display assembly; at a visibility controller of the display assembly, switching the display assembly from the full visibility mode to a restricted visibility mode; and at the display layer of the display assembly, forming the display image for viewing in the restricted visibility mode by providing display light from a second subset of display elements of the display layer, the second subset of display elements positioned proximate to the plurality of conductive traces shaped and positioned to block a second portion of the display light from the second subset of display elements and thereby control visibility of the display image.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display assembly, comprising:
a display layer including a plurality of display elements to provide display light and collectively form a display image for viewing, each of the plurality of display elements being individually addressable, the plurality of display elements including a first subset of display elements used while the display assembly is operating in a full visibility mode, and including a second subset of display elements used while the display assembly is operating in a restricted visibility mode;
a touch-sensitive layer including a plurality of conductive traces disposed proximate to the display layer, wherein each display element of the first subset of display elements is bordered on at least one side by one or more conductive traces having a first average thickness, such that the one or more conductive traces having the first average thickness block a first portion of the display light while the display assembly is operating in the full visibility mode, and wherein each display element of the second subset of display elements is bordered on at least one side by one or more conductive traces having a second average thickness that is greater than the first average thickness, such that the one or more conductive traces having the second average thickness block a second portion of the display light, greater than the first portion of the display light, while the display assembly is operating in the restricted visibility mode; and
a visibility controller to switch the display assembly between the full visibility mode and the restricted visibility mode to control visibility of the display image.

2. The display assembly of claim 1, wherein the display layer includes a plurality of pixels, and each pixel is portioned into a first display element and a second display element of the plurality of display elements.

3. The display assembly of claim 2, wherein the first display element of each pixel is included in the first subset of display elements, and wherein the second display element of each pixel is included in the second subset of display elements.

4. The display assembly of claim 3, wherein the second display element of each pixel is bordered on three or more sides by three or more conductive traces, including two parallel conductive traces and a third orthogonal conductive trace, the two parallel conductive traces having a greater thickness than the third orthogonal conductive trace.

5. The display assembly of claim 4, wherein the two parallel conductive traces are positioned to block at least a portion of the display light propagating along a horizontal viewing axis of the display image.

6. The display assembly of claim 1, wherein the plurality of display elements are a plurality of pixels, and wherein each pixel of the first plurality of display elements is paired with a corresponding pixel of the second plurality of display elements.

7. The display assembly of claim 6, wherein each pixel of the first plurality of display elements is bordered on four sides by four conductive traces having the first average thickness, and wherein each pixel of the second plurality of display elements is bordered on four sides by four conductive traces having the second average thickness.

8. The display assembly of claim 1, wherein each display element of the second subset of display elements is positioned proximate to a microlens array to block at least a portion of the display light of the second subset of display elements while the display assembly is operating in the restricted visibility mode.

9. The display assembly of claim 8, wherein the display layer includes a plurality of pixels, and each pixel is portioned into a first display element of the first subset of display elements, and a second display element of the second subset of display elements, such that each pixel is partially covered by a corresponding microlens array.

10. The display assembly of claim 8, wherein the plurality of display elements are a plurality of pixels, each pixel of the first subset of display elements is paired with a corresponding pixel of the second subset of display elements, and wherein pixels of the second plurality of display elements are at least partially covered by corresponding microlens arrays, while pixels of the first subset of display elements lack microlens arrays.

11. The display assembly of claim 1, wherein the restricted visibility mode reduces visibility of the display image from viewing angles greater than 30 degrees away from a reference axis perpendicular to a plane of the display layer.

12. The display assembly of claim 1, wherein the display layer includes an encapsulated organic light-emitting diode (OLED) display.

13. The display assembly of claim 1, wherein the plurality of conductive traces are implemented as part of an on-cell touch sensor of the touch-sensitive layer.

14. A display device, comprising:
a device housing;
a display controller to control operation of a plurality of display elements to form a display image for viewing;
a touch-sensitive display controllable by the display controller to present the display image, the touch-sensitive display comprising:
a display layer including the plurality of display elements to provide display light and collectively form the display image, each of the plurality of display elements being individually addressable, the plurality of display elements including a first subset of display elements used while the display device is operating in a full visibility mode, and including a second subset of display elements used while the display device is operating in a restricted visibility mode; and
a touch-sensitive layer including a plurality of conductive traces disposed proximate to the display layer wherein each display element of the first subset of display elements is bordered on at least one side by one or more conductive traces having a first average thickness, such that the one or more conductive traces having the first average thickness block a first portion of the display light while the display device is operating in the full visibility mode, and wherein each display element of the second subset of display elements is bordered on at least one side by one or more conductive traces having a second average thickness that is greater than the first average thickness, such that the one or more conductive traces having the second average thickness block a second portion of the display light, greater than the first portion of the display light, while the display device is operating in the restricted visibility mode; and
a visibility controller to switch the touch-sensitive display between the full visibility mode and the restricted visibility mode to control visibility of the display image.

15. The display device of claim 14, wherein the display layer includes a plurality of pixels, and each pixel is portioned into a first display element of the first subset of display elements, and a second display element of the second subset of display elements.

16. The display device of claim 14, wherein the plurality of display elements are a plurality of pixels, and wherein each pixel of the first plurality of display elements is paired with a corresponding pixel of the second plurality of display elements.

17. The display device of claim 14, wherein each display element of the second subset of display elements is positioned proximate to a microlens array to block at least a portion of the display light of the second subset of display elements while the display device is operating in the restricted visibility mode.

18. A method for display image visibility restriction, the method comprising:
at a display layer of a display assembly, forming a display image for viewing in a full visibility mode by providing display light from a first subset of display elements of the display layer, wherein each display element of the first subset of display elements is bordered on one or more sides by one or more conductive traces having a first average thickness, such that the one or more conductive traces having the first average thickness block a first portion of the display light;
at a visibility controller of the display assembly, switching the display assembly from the full visibility mode to a restricted visibility mode; and
at the display layer of the display assembly, forming the display image for viewing in the restricted visibility mode by providing display light from a second subset of display elements of the display layer, wherein each display element of the second subset of display elements is bordered on one or more sides by one or more conductive traces having a second average thickness, greater than the first average thickness, such that the one or more conductive traces having the second average thickness block a second portion of the display light, greater than the first portion of the display light, while the display assembly is operating in the restricted visibility mode.

* * * * *